(12) United States Patent
Wifling et al.

(10) Patent No.: US 11,333,070 B2
(45) Date of Patent: May 17, 2022

(54) GAS TURBINE ENGINE AND METHODS OF OPERATING SAME

(71) Applicant: General Electric Company, Schenectady, NY (US)

(72) Inventors: Ronald Wifling, Küssaberg (DE); Jose Antonio Cuevas-Alvarez, Aargau (CH); Christophe Doublet, Aargau (CH); Tarun Kapoor, Aargau (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 236 days.

(21) Appl. No.: 16/673,461

(22) Filed: Nov. 4, 2019

(65) Prior Publication Data
US 2020/0173360 A1   Jun. 4, 2020

(30) Foreign Application Priority Data
Nov. 8, 2018   (EP) ..................... 18205188

(51) Int. Cl.
*F02C 3/30*   (2006.01)
*F02C 7/143*   (2006.01)
(Continued)

(52) U.S. Cl.
CPC ............. *F02C 3/305* (2013.01); *F02C 3/30* (2013.01); *F02C 7/1435* (2013.01); *F02C 9/20* (2013.01);
(Continued)

(58) Field of Classification Search
CPC .... F02C 3/305; F02C 9/20; F02C 3/30; F02C 7/1435; F02C 9/16; F05D 2260/212;
(Continued)

(56) References Cited

U.S. PATENT DOCUMENTS

2001/0022078 A1*  9/2001  Horii ..................... F02C 7/1435
                                                             60/39.182
2006/0010876 A1   1/2006  Hoffmann et al.
(Continued)

FOREIGN PATENT DOCUMENTS

DE      102012224009 A1    6/2014

OTHER PUBLICATIONS

EP Extended Search Report for related application 18205188.8-1007 dated May 21, 2019; 8 pp.

*Primary Examiner* — Gerald L Sung
*Assistant Examiner* — Rene D Ford
(74) *Attorney, Agent, or Firm* — Armstrong Teasdale LLP

(57) ABSTRACT

A gas turbine engine that includes an inlet volume flow control appliance and methods of operating the same are provided. The method includes operating the gas turbine engine with the inlet volume flow control appliance supplying a compressor inlet volume flow that is below a maximum compressor inlet volume flow. A mass flow of a liquid agent is added to a compressor gas mass flow while the gas turbine engine is operated with a compressor inlet volume flow below a maximum compressor inlet volume flow. The mass flow of a liquid agent may be controlled as a function of the pitch of variable inlet guide vanes. The method further comprises adjusting the volume flow control appliance to increase the compressor inlet volume flow and increasing the mass flow of liquid agent added to the compressor gas mass flow while the inlet volume flow control appliance increases the compressor inlet volume.

19 Claims, 2 Drawing Sheets

(51) Int. Cl.
*F02C 9/20* (2006.01)
*F02C 9/16* (2006.01)
(52) U.S. Cl.
CPC .......... *F02C 9/16* (2013.01); *F05D 2260/212* (2013.01); *F05D 2270/053* (2013.01); *F05D 2270/301* (2013.01)
(58) Field of Classification Search
CPC ......... F05D 2270/053; F05D 2270/301; F05D 2270/3062
See application file for complete search history.

(56) References Cited

U.S. PATENT DOCUMENTS

2014/0033720 A1 2/2014 Kim et al.
2014/0325990 A1 11/2014 Takeda et al.

\* cited by examiner

GAS TURBINE ENGINE AND METHODS OF OPERATING SAME

CROSS REFERENCE TO RELATED APPLICATIONS

This application claims priority to and the benefit of the filing date of EP Application No. 18205188.8 filed Nov. 8, 2018 for METHOD FOR OPERATING A GAS TURBINE ENGINE, AND GAS TURBINE ENGINE, which is hereby incorporated by reference.

BACKGROUND

The present disclosure relates generally to gas turbine engines, and more particularly, to methods of operating gas turbine engines to facilitate reducing differential thermal expansion and rubbing of components within a compressor of a gas turbine engine.

At least some known gas turbine engines include an inlet, a compressor, a combustor, and at least one turbine engine coupled together in a serial flow arrangement. During operation, within at least some known gas turbine engines, load changes may result in temperature variations, not only in the combustor and turbine engine, but also in the compressor, due to the changing pressure ratio, which in turn results in variable temperature rise during compression. Such temperature rise may be more common during operation states in which the load variation is related to a change of the compressor mass flow. Because of the flow characteristics of a downstream turbine, the pressure ratio may vary greatly with the compressor mass flow. For example, if the turbine inlet temperature is controlled to be substantially constant, or if the temperature rises with a rising mass flow, the temperature in the compressor may be correlated to the compressor pressure ratio.

As such, at least some known gas turbine engines include an appliance that provide limited benefit and that are used to control the compressor mass flow, or more specifically, the compressor inlet volume flow. Suitable appliances may include a variable inlet guide vane row or variable compressor vanes. The use of such appliances facilitates controlling the compressor mass flow at a substantially constant inlet fluid temperature and pressure. Temperature changes within the flow path may, due to the different thermal inertia of components, result in non-matching thermal expansion of components. Such thermal expansion may cause rubbing between components, enhanced wear or damage, or may create excess gaps that adversely affect the performance of the gas turbine.

BRIEF DESCRIPTION

In one aspect, a method for operating a gas turbine engine is provided. The gas turbine engine includes an inlet volume flow control appliance configured to control a compressor inlet volume flow. It will be readily appreciated that, in controlling the inlet volume flow, the inlet volume flow appliance is also suitable to control a compressor gas mass flow, whereas the mass flow is further influenced for example, by the temperature and pressure of the gas at the compressor inlet, and whereas the volume flow is controlled by the inlet volume flow control appliance independent of such uncontrollable parameters. The method includes operating the gas turbine engine using the inlet volume flow control appliance to operate the gas turbine engine with a compressor inlet volume flow that is below a maximum compressor inlet volume flow. A mass flow of a liquid agent is added to the compressor gas mass flow while the gas turbine engine is operated with a compressor inlet volume flow below the maximum compressor inlet volume flow. The method further includes adjusting the volume flow control appliance to change the compressor inlet volume flow, and controlling the mass flow of liquid agent, at least during a part of the process of adjusting the volume flow control appliance. Controlling the mass flow of liquid agent shall in this respect not be understood as mandatorily performing a closed loop control, but rather may be understood synonymously to changing, varying, altering, or adjusting Controlling the mass flow of liquid agent encompasses at least one of increasing the mass flow of liquid agent added to the compressor gas mass flow when the inlet volume flow control appliance is adjusted to increase the compressor inlet volume flow, and/or decreasing the mass flow of liquid agent added to the compressor gas mass flow when the inlet volume flow control appliance is adjusted to decrease the compressor inlet volume flow.

In other aspects, the method for operating a gas turbine engine includes controlling, for example via increasing or decreasing, the mass flow of liquid agent added to the compressor air mass flow while changing the power output of the gas turbine engine. In more particular embodiments, the mass flow of liquid agent is increased when increasing the power output of the gas turbine engine and/or is decreased when decreasing the power output of the gas turbine engine. Thus, when increasing the power output of the gas turbine engine, and accordingly the pressure ratio, increased internal cooling is provided to the compressor which facilitates in at least reducing the temperature increase inside the compressor over time, while increasing the power output. When decreasing the power output of the gas turbine engine and accordingly the pressure ratio, decreased internal cooling is provided to the compressor which facilitates in at least reducing the temperature decrease inside the compressor over time, while decreasing power output. Reducing temperature gradients over time may accordingly be achieved. Lowering maximum operating temperatures inside the compressor, as well as reducing temperature gradients, are helpful in mitigating certain issues described herein with known engines.

In other aspects, a gas turbine engine is provided that includes a compressor and an appliance for providing a mass flow of liquid agent to a compressor gas mass flow, wherein a control device is provided to perform a method as outlined above and described herein. The gas turbine engine may further include an inlet volume flow control appliance suitable to control a compressor gas mass flow. The inlet volume flow control appliance may include a row of inlet guide vanes with variable pitch.

It should be understood that the drawings are schematic, and details not required for instructional purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION

It is understood that the flow through the compressor heats up while it is compressed. It is known to inject a liquid agent into a compressor mass flow of a gas turbine engine in order to augment power output, above a rated maximum power output without the injection of a liquid agent into the compressor mass flow. Evaporation of the liquid agent yields an internal cooling of the compressor, which may under certain operating conditions reduce compressor power consumption and enable more fuel to be burned without exceeding a maximum admissible turbine inlet temperature. As a power augmentation technique adding liquid agent to a compressor mass flow is commonly only applied when operating the gas turbine engine at or above a power output achieved in providing a maximum compressor inlet volume flow and maximum admissible turbine inlet temperature. In other words, an injection or other addition of liquid agent to a compressor mass flow is commonly only applied when a compressor inlet volume flow control appliance is set to operate the gas turbine engine with a maximum compressor inlet volume flow.

In contrast, the present disclosure discloses a gas turbine engine and methods of operating the same to facilitate reducing thermal gradients over time inside the compressor of the gas turbine engine. More specifically, in some embodiments, the methods facilitate reducing thermal gradients while the pressure ratio within the compressor operation changes. For example, in one embodiment, thermal gradients are reduced while modulating the compressor mass flow, or more particularly, a compressor inlet mass flow, while the mass flow changes. As a result, differential thermal expansion, and more specifically, rubbing of components within the compressor is facilitated to be reduced. Further effects and advantages of the disclosed subject matter, whether explicitly mentioned or not, will become apparent in view of the disclosure provided below.

It is noted that within the framework of the present disclosure the use of the indefinite article "a" or "an" does in no way stipulate a singularity nor does it exclude the presence of a multitude of the named member or feature. Rather, the use of the article "a" or "an" is to be read in the sense of "at least one" or "one or a multitude of".

Figure 1:
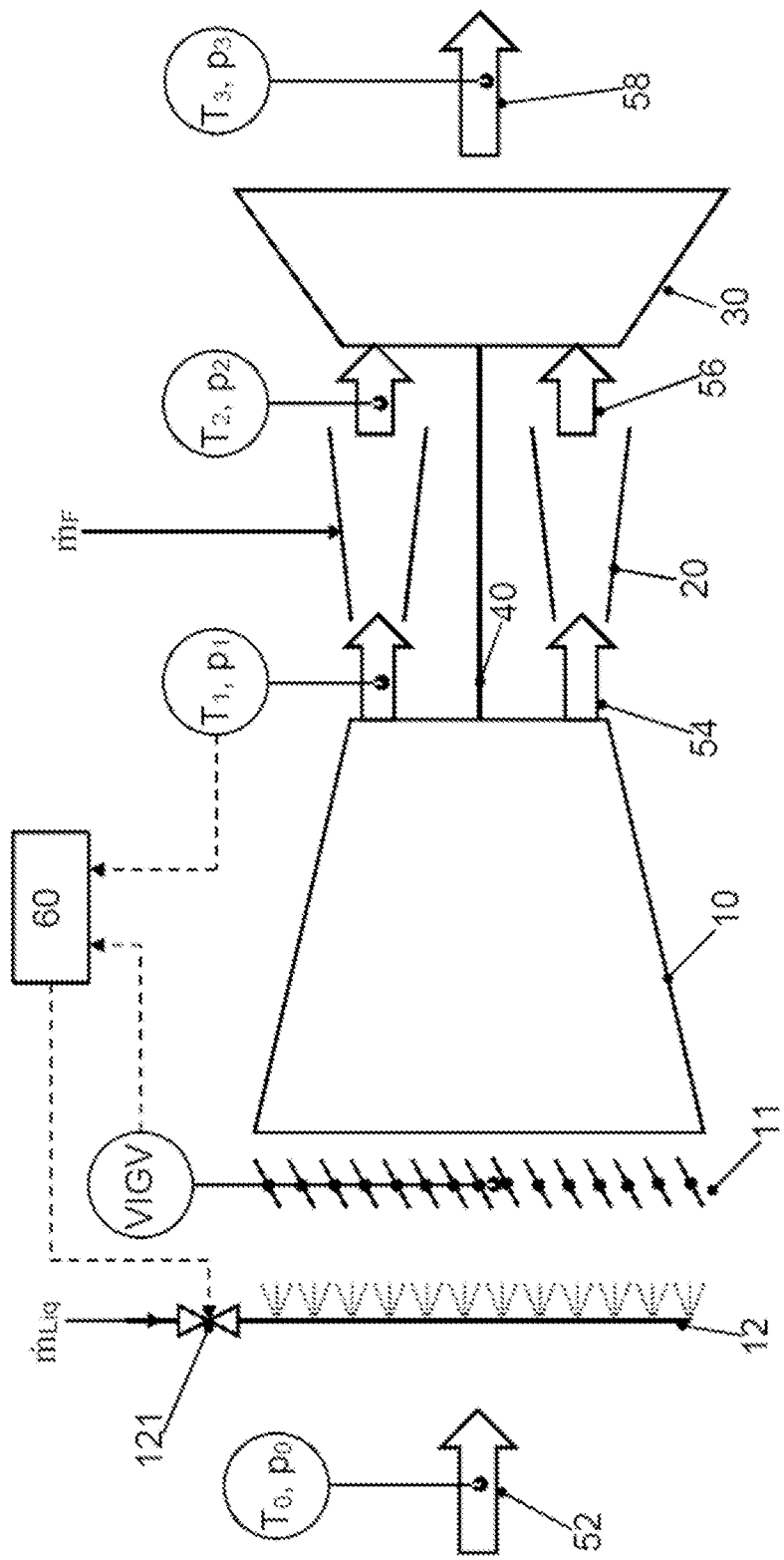
FIG. 1 is a schematic view of an exemplary gas turbine engine including a variable inlet guide vane.

FIG. 1 is a schematic view of an exemplary gas turbine engine assembly 8 including a variable inlet guide vane 11. In the exemplary embodiment, engine 8 is an air-breathing gas turbine and includes a compressor 10, a combustor 20 and an expansion turbine 30 that are all coupled together in a serial flow arrangement. More specifically, in the exemplary embodiment, turbine 30 is coupled to compressor 10 via a shaft 40 that enables turbine 30 to drive compressor 10 and enables turbine 30 to be coupled to a load, such as for example, a generator (not shown). Although not shown, the generator should be known to one of ordinary skill in the art.

Combustor 20 is supplied with a fuel mass flow $\dot{m}_F$. Compressor 10 includes a row of variable inlet guide vanes 11 that enable control of inlet volume flow into compressor 10 and thus control of the working fluid mass flow of gas turbine engine assembly 8. Inlet guide vanes 11 thus function as an inlet volume control appliance that is suitable to control a compressor gas mass flow. The pitch of variable inlet guide vanes 11 is denoted by VIGV. The inlet volume flow control appliance 11 may in some embodiments include more than one row of vanes. For example, in some embodiments, at least one row of variable guide vanes 11 may be arranged upstream from a first row of rotating compressor blades so as to constitute a variable inlet guide vane row 11.

During operation, compressor 10 receives a flow of inlet air 52 at a temperature $T_0$ and a pressure $p_0$. Pressure $p_0$ may be, but is not limited to only being, at least approximately equal an ambient pressure, apart from potential pressure losses in air filters, silencers and/or other installations in an inlet duct (not shown). Compressor 10 compresses the flow of inlet air to a pressure $p_1$, which varies depending on, for example, the working fluid mass flow, flow characteristics of expansion turbine 30, the inlet temperature to the turbine, and/or potential additional influencing parameters. As a result of the compression in compressor 10, the temperature of the fluid flowing through the compressor increases to an outlet temperature $T_1$. More specifically, compressor outlet or discharge temperature T1 increases with an increasing compressor pressure ratio $p_1/p_0$. The compressed air flow 54 is discharged from compressor 10 downstream into combustor 20, wherein it is mixed with fuel and the fuel mass flow $\dot{m}_F$ is combusted and the resulting flue gas flow is discharged from combustor 20 at an elevated temperature $T_2$, while the pressure due to inevitable losses has decreased to pressure $p_2$.

Flue gas flow 56 is discharged from combustor 20 into expansion turbine 30, wherein the flue gas flow 56 is expanded to a pressure $p_3$ to generate useful power used to drive compressor 10 and an external load. Due to the expansion in expansion turbine 30, a temperature of exhaust flow 58 decreases to temperature $T_3$. The pressure $p_3$ downstream from expansion turbine 30 may be, but is not limited to only being, approximately equal to the ambient pressure, apart from pressure losses in installations downstream in an exhaust duct, such as, for example, tubing of a heat recovery steam generator, scrubbers, and so forth. Likewise, as one of ordinary skill in the art will appreciate that expansion turbine outlet pressure $p_3$ may be, but is not limited to only being, approximately equal the compressor inlet pressure $p_0$, apart from pressure losses in the exhaust duct and in the air intake.

It is noted that the pressures and temperatures at the inlet and outlet of certain components of a gas turbine engine may be referred to as working fluid temperatures and pressures. Further, the pressures and temperatures referred to in the context of this application generally mean total pressures and temperatures, that is, the pressure and temperature of a fluid when it has isentropically been decelerated to standstill, including the dynamic pressure head of a fluid flow and the temperature which corresponds to the kinetic energy of a fluid flow. As will be further appreciated, pressure $p_3$ is essentially fixed. Expansion turbine 30 essentially functions as a throttle for the working fluid flowing through expansion turbine 30. One of ordinary skill in the art will readily appreciate that the pressure ratio $p_2/p_3$ over the expansion turbine is positively correlated with the mass flow through the expansion turbine 30 and the temperature $T_2$ at the inlet of the expansion turbine. That is, the pressure ratio $p_2/p_3$ increases when the mass flow and/or temperature are increased, and decreases when the mass flow and/or temperature are decreased.

It will further be appreciated that limiting turbine inlet temperature $T_2$ facilitates preventing temperature $T_2$ from exceeding an upper limit, and thus facilitates preventing damage to combustor 20, the first stages of turbine 30, and to further hot gas path components. One of ordinary skill will also readily appreciate that maintaining temperature T3, at the turbine outlet, below a threshold temperature enables the use of cheaper materials in the later turbine stages and in the exhaust duct of gas turbine engine 30. A maximum rated power output of gas turbine engine 8 is achieved when variable inlet guide vanes 11 are adjusted to facilitate providing a maximum inlet volume flow to compressor 10, while turbine inlet temperature $T_2$ is maintained at the maximum permitted value. It will be appreciated that the rated maximum power output of the gas turbine engine depends on the temperature $T_0$ and the pressure $p_0$ at the compressor inlet, as those values influence the working fluid mass flow when the compressor inlet volume flow is maximum.

The power output of gas turbine engine 8 may further be enhanced by injecting a liquid agent, commonly water, into the compressor mass flow. In the exemplary embodiment, an injection device 12 is provided upstream from the row of variable inlet guide vanes 11 to enable a liquid agent mass flow $\dot{m}_{Liq}$ to be injected into inlet air flow 52. More specifically, in the exemplary embodiment, the liquid agent mass flow is controlled by a control valve 121, which in some embodiments, could also be a plurality of control valves staged to control liquid mass flow to various injection stages of compressor 10. When the injection of liquid agent is active, droplets of liquid agent evaporate while traveling through compressor 10 due to the heating of the air mass flow through compressor 10 while being compressed. Moreover, the injection of the liquid agent facilitates cooling of compressor 10, which results in a lower power consumption of compressor 10, and thus the net power output of gas turbine engine 8 is facilitated to be increased. Generally, the injection of liquid agent into the compressor mass flow is initiated when gas turbine engine 8 is operating at its rated maximum power output, that is, with the row of variable inlet guide vanes 11 or other inlet volume flow control appliance set to operate the gas turbine engine with the maximum compressor inlet volume flow.

During normal operations at low power outputs, the variable inlet guide vanes 11 are closed, i.e. the compressor inlet volume flow is minimized. To facilitate increasing the power output of gas turbine engine 8, the turbine inlet temperature may be increased by increasing the fuel mass flow $\dot{m}_F$ at constant air mass flow. Alternatively, adjusting the position of the inlet volume flow control appliance, i.e., the variable inlet guide vanes 11, facilitates increasing the air mass flow, while simultaneously increasing the fuel mass flow. Such adjustments facilitate increasing the power output of gas turbine engine 8 without increasing the turbine inlet temperature $T_2$ In fact, such power output may be attained while maintaining the turbine inlet temperature $T_2$ constant.

Increasing the compressor inlet volume flow or air mass flow correlates with a strong increase of the pressure ratio of the gas turbine cycle, that is, pressures $p_1$ and $p_2$ and hence the pressure ratio $p_1/p_0$ of compressor 10 and the pressure ratio $p_2/p_3$ of turbine 30 increase strongly. The increased pressure ratio $p_1/p_0$ creates a strong increase of the compressor discharge temperature $T_1$. Along with the increase of the compressor pressure ratio $p_1/p_0$ and compressor discharge temperature $T_1$, compressor components inside compressor 10 increase in temperature, in particular in the downstream compressor stages. For example, the blade and vane airfoils inside compressor 10 have a large surface exposed to the working fluid flow as compared to the mass, and thus heat up the quickest as result of the increasing temperature of the surrounding working fluid flow. Along with heating up, the airfoils are subject to thermal expansion, which is by far faster than the thermal expansion of the compressor housing and shaft.

Gaps between the airfoil tips and opposed structures are designed sufficiently small so as to facilitate minimizing leakage flows. Disbalances in thermal growth between the airfoils on the one hand, and the housing and rotor on the other hand, may create contact between airfoil tips and counterpart components. The resulting rubbing may result in damage to the components and/or in enlarging the gaps defined between components. Increased gaps enable larger leakage flows and turbine performance degradations. Such issues generally become more prevalent as the gradient of the pressure $p_1$ at the compressor outlet increases.

To facilitate reducing the likelihood of disbalances in thermal growth, in the exemplary embodiment, gas turbine engine 8 includes a control device 60 that receives operating parameter signals such as, but not limited to, a signal representative of the pitch VIGV of variable inlet guide vanes 11, the pressure $p_1$ at the compressor outlet, and/or the temperature $T_1$ at the compressor outlet. Control device 60 outputs a control signal to the liquid mass flow control valve or the liquid mass flow control valves 121. Control device 60 controls, via control valve or control valves 121, the mass flow $\dot{m}_{Liq}$ of liquid agent channeled to the compressor gas mass flow. For example, in one embodiment, control device 60 may control the mass flow $\dot{m}_{Liq}$ of liquid agent dependent on the pitch VIGV of the variable inlet guide vanes 11. Control device 60 may be also be configured to increase the mass flow $\dot{m}_{Liq}$ of liquid agent, while the compressor inlet mass flow control appliance 11 increases the compressor inlet volume flow and consequently the compressor gas mass flow. As described above, due to the fluid mechanic characteristics of turbine 30, as the mass flow $\dot{m}_{Liq}$ of liquid agent is increased, pressure $p_1$ at the compressor outlet increases.

In injecting liquid agent into the compressor gas mass flow, internal cooling of the compressor occurs, and any increase of temperature $T_1$ at the compressor outlet, and more specifically, inside the compressor, is at least slowed. As a result, disbalances in thermal growth of components inside compressor 10 is thus diminished, and the risk of component rubbing is facilitated to be reduced. The mass flow $\dot{m}_{Liq}$ of liquid agent may be controlled as a continuous function of the setting VIGV of the inlet volume flow control appliance 11, but is not limited to only being controlled continuously. For example, the mass flow $\dot{m}_{Liq}$ of liquid agent may be controlled discontinuously, in steps or stages. For instance, in one embodiment, various stages of a liquid agent injection appliance may be operated with an on/off control, and may one after the other be switched to increase compressor inlet volume flow. As the mass flow of liquid agent is controlled, as a function of the setting VIGV of the inlet volume flow control appliance 11, i.e., the pitch of the variable inlet guide vanes, in the exemplary embodiment, a mass flow of a liquid agent is supplied to the compressor gas mass flow, while the inlet volume flow control appliance limits the gas turbine engine to having a compressor inlet volume flow below a maximum compressor inlet volume flow.

In some embodiments, the injection of liquid agent continues until the compressor inlet volume flow or compressor outlet pressure is reduced again. In other embodiments, however, the mass flow of liquid agent may be gradually reduced after a pre-determined time delay after a stationary power output has been reached. The power output may be either an absolute Megawatts power output or a relative power output related to a rated power output of gas turbine engine 8 under the actually present ambient conditions, and with or without liquid agent supplied to the compressor mass flow. It is known that the rated power output of a gas turbine engine changes with the ambient conditions. If, for example, the ambient temperature rises while all other operating parameters remain constant, the rated maximum power output will decrease. The same Megawatts power output at a higher ambient temperature will result in a higher relative power output. One of ordinary skill in the art is readily aware of the calculation of a relative power output from an absolute Megawatts power output based upon specific ambient conditions, and is familiar of calculating the actual rated power output at any conditions from a rated power output at reference conditions, for instance at ISO 2533 reference conditions. Moreover, As one of ordinary skill in the will readily appreciate, the rated power output decreases with an increasing temperature $T_0$ of the inlet air flow 52. Thus, for example, at warming up ambient conditions the inlet volume flow control appliance 11 may open and increase the inlet volume flow even when the absolute Megawatts power output is constant. That is, the mass flow $\dot{m}_{Liq}$ of liquid agent may change even if the absolute Megawatts power output of gas turbine engine 8 remains substantially constant.

Figure 2:
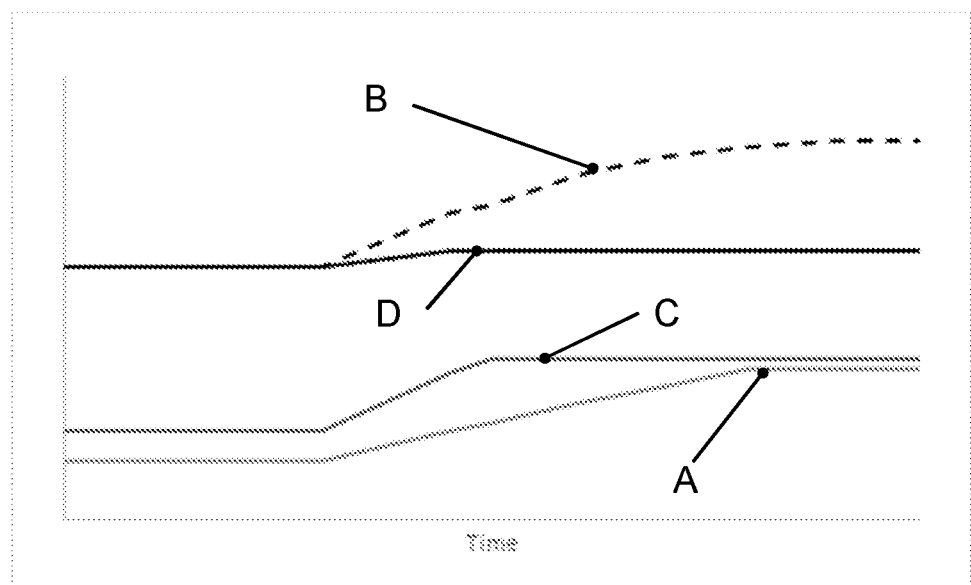
FIG. 2 is an exemplary schematic illustration of the effects of the temperature inside and downstream from a compressor of the gas turbine engine shown in FIG. 1.

FIG. 2 is an exemplary schematic illustration of the effects of the temperature inside and downstream from compressor 10 (shown in FIG. 1). More specifically, FIG. 2 is a schematic graph illustrating the effect of increasing the mass flow of liquid agent into the compressor mass flow, while increasing the compressor inlet volume flow to increase the power output of gas turbine engine 8 (shown in FIG. 1). Within FIG. 2, horizontal axis represents time, the vertical axis represents a temperature in or downstream from compressor 10, a setting of a volume flow control appliance 11 (shown in FIG. 1), and an amount of liquid agent mass flow. More specifically, the line denoted at "A" represents the setting of a volume flow control appliance 11, wherein an increasing value of the setting is correlated with an increasing compressor inlet volume flow, and hence, provided ambient conditions remain substantially constant, an increasing compressor mass flow. The increasing compressor mass flow generally results in increasing the pressure ratio due to the flow characteristics of the expansion turbine 30 downstream, in particular when the mass flow of fuel is controlled to maintain the turbine inlet temperature substantially constant. Without any control of the liquid agent mass flow the gas temperature inside or downstream of the compressor increases, as represented by the dashed line labeled "B".

Accordingly, airfoils inside the compressor, due to their comparatively small thermal inertia and intense heat exchange with the flow inside the compressor, increase in temperature with only a small time delay. One of ordinary skill in the art will readily appreciate that during the operation of a gas turbine engine the increase of the mass flow, and accordingly the related increase of the temperature inside or after the compressor, may occur in a relatively short time period. The housing and rotor of the compressor will heat up significantly slower than the airfoils, due to the higher thermal inertia and the less intense heat transfer with the gas flowing inside the compressor, as compared to the airfoils. Thus, according to the method described herein, the supply of a mass flow of liquid agent to the compressor mass flow is increased at least during actuation of the volume flow control appliance and by increasing the compressor mass and volume flow, as illustrated by the line denoted at "C". The line at "C" schematically and qualitatively illustrates a mass flow of liquid agent added to the compressor mass flow, which in the exemplary embodiment, is increased during approximately 50 percent of the time during which the compressor mass and volume flows are increased. As a result, an increase of the temperature inside and downstream from the compressor is facilitated to be reduced, as compared to known gas turbine engines, as shown by the line denoted at "D". Thus, increasing a mass flow of liquid agent to the compressor mass flow, while adjusting the volume control appliance to increase the compressor inlet volume flow, facilitates decreasing temperature gradients over time and facilitates improving long-term operating performance, efficiency and reliability of the engine.

The addition of liquid agent to a compressor mass flow also facilitates mitigating certain issues with non-stationary engine operation and fast changing engine power output, in that the internal cooling caused by evaporation of the liquid agent inside the compressor facilitates offsetting the increase of adiabatic temperature rise, such as for example, when the pressure ratio $p_1/p_0$ is rapidly changed by changing the compressor inlet volume flow due to a rise of the ambient temperature at a constant absolute Megawatts power output, and/or due to a rise of the compressor gas mass flow to increase absolute Megawatts power output, or a combination thereof.

It is noted that control of the added mass flow of liquid agent, dependent on the power output, may be performed continuously or in discontinuous steps over the power output and/or the compressor inlet volume flow, such as, for example, when drawing the mass flow of added liquid agent versus the power output of the gas turbine engine or the compressor inlet volume flow, or the setting of a compressor inlet volume flow appliance, respectively, the resulting graph may be continuous or may exhibit steps or jumps. The liquid agent may, at least in part, be provided to the compressor gas mass flow upstream from a first row of rotating compressor blades.

Changing the power output of the gas turbine engine may in certain operating conditions include changing the set-point of the inlet volume flow control appliance so as to change the compressor inlet volume flow with the same sign as the change of the power output. For example, operating a gas turbine engine at a constant absolute Megawatts power output while the ambient temperature rises, results in an increase of the relative power output, as described above. With the same volume flow, the mass flow would decrease, and thus, to maintain the Megawatts power output, it might, dependent upon the gas turbine engine's operating regime, be necessary to increase the inlet volume flow at least to the extent to maintain the mass flow.

In aspects, the mass flow of the liquid agent to the compressor gas mass flow may be controlled dependent upon at least one of the set-point and/or an actual setting of the inlet volume flow control appliance 11. In other aspects, the mass flow of the liquid agent to the compressor gas mass flow may be controlled dependent upon at least one of: a compressor discharge pressure and/or a compressor pressure ratio. In still further aspects, the mass flow of the liquid agent to the compressor gas mass flow may be controlled dependent upon a gradient of at least one of the compressor discharge pressure and/or compressor pressure ratio $p_1/p_0$, wherein the gradient is a gradient over time. It is understood that the compressor pressure ratio is a ratio of the total pressure at the compressor outlet to the total pressure at the compressor inlet. It is further appreciated that, while from a dogmatic standpoint the compressor pressure ratio $p_1/p_0$ would be the correct parameter to be applied, in particular for a stationary engine the ambient pressure and thus the total pressure at the compressor inlet varies so little that applying the discharge pressure may yield by far sufficient accuracy for the control. One of ordinary skill in the art will readily appreciate that the discharge pressure in this context is a total pressure, including any dynamic pressure components.

In still further aspects, the method may include determining at least one temperature inside the compressor or downstream from the compressor and upstream from the combustor. The temperature may for example be determined in one, or between two, of the most downstream compressor stages, or in a plenum downstream from the compressor and upstream from the combustor. The mass flow of the liquid agent provided to the compressor gas mass flow may then be dependent upon at least one of the temperatures and/or a gradient of at least one of the temperatures. The mass flow of the liquid agent may in some embodiments, be controlled to maintain the temperature constant or below a threshold, or so as to maintain the gradient of the temperatures over time below a threshold.

Moreover, the mass flow of the liquid agent may be controlled continuously and/or in discrete steps or increments, with the choice of control being dependent upon the applied hardware for discharging the liquid agent to the compressor gas mass flow. While a continuous control may yield certain advantages, a control in a stepped manner may be found easier to implement. Moreover, the hardware may include a number of liquid agent discharge stages which can be simply switched on and off, which in turn yields cost savings and may facilitate control. However, a continuous control may apparently yield an improved control accuracy, if required.

In some embodiments, the method may include gradually decreasing the mass flow of the liquid agent after a delay time once a stationary power output has been reached. Such a gradual decrease may result in efficiency improvements. On the downside, such a decrease may result in higher temperatures in the most downstream compressor stages. Moreover, the liquid agent provision to the compressor gas mass flow then is not available during a subsequent power output decrease and the related decreasing temperatures in the compressor. It is apparent that, due to different thermal inertia, comparatively fast cooling inside the compressor may yield in comparable issues with rubbing and/or excessive gaps as fast heating.

The above-described embodiments of gas turbines and methods of operating the same, overcome at least some disadvantages of known gas turbine operations. Specifically, in the exemplary embodiment, the addition of liquid agent to a compressor mass flow facilitates cooling inside the compressor while increasing the power output from the gas turbine engine. In addition, the addition of the liquid agent to the compressor facilitates offsetting the increase of adiabatic temperature rise.

Exemplary embodiments of a mass flow control apparatus for use in a turbine engine are described above in detail. The control components are not limited to the specific embodiments described herein, but rather, components of systems may be utilized independently and separately from other components described herein. For example, the control devices may also be used in combination with other gas turbine engines and operating methods, and are not limited to practice with only the turbine engine assembly described herein. Rather, the exemplary embodiment can be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

What is claimed is:

1. A method for operating a gas turbine engine, the gas turbine engine including an inlet volume flow control appliance suitable to control a compressor gas mass flow, said method comprising:
    operating the gas turbine engine with the inlet volume flow control appliance set to operate the gas turbine engine at a first level of a compressor inlet volume flow, wherein the first level is below a maximum compressor inlet volume flow;
    adding a mass flow ($\dot{m}_{Liq}$) of a liquid agent at a first rate to a compressor gas mass flow while the inlet volume flow control appliance is set to operate the gas turbine engine at the first level of the compressor inlet volume flow;
    adjusting the inlet volume flow control appliance to increase the compressor inlet volume flow from the first level to a second level, the adjustment occurring over an adjustment time period;
    increasing the mass flow of liquid agent added to the compressor gas mass flow from the first rate to a second rate during the adjustment time period; and
    after the adjustment time period, maintaining operation of the gas turbine engine at the second level of the compressor inlet volume flow and the second rate of the mass flow of liquid agent.

2. The method in accordance with claim 1, further comprising:
    subsequent to maintaining operation of the gas turbine engine at the second level of the compressor inlet volume flow and the second rate of the mass flow of liquid agent, adjusting the inlet volume flow control appliance to decrease the compressor inlet volume flow from the second level to a third level, the adjustment occurring over a second adjustment time period; and
    decreasing the mass flow of liquid agent provided to the compressor air mass flow from the second rate to a third rate during the second adjustment time period.

3. The method in accordance with claim 1 wherein increasing the mass flow of liquid agent provided to the compressor air mass flow further comprises changing the power output of the gas turbine engine based on at least one of an absolute Megawatts power output and a relative power output related to a rated power output of the gas turbine engine under the current present ambient conditions.

4. The method in accordance with claim 1 wherein increasing the mass flow of liquid agent further comprises providing the liquid agent to the compressor gas mass flow upstream from a first row of rotating compressor blades.

5. The method in accordance with claim 1 wherein increasing the mass flow of liquid agent further comprises providing the liquid agent to the compressor gas mass flow upstream from a first row of variable guide vanes of the inlet volume flow control appliance.

6. The method in accordance with claim 1 further comprising changing the power output of the gas turbine engine by changing a setpoint of the inlet volume flow control appliance such that the compressor inlet volume flow is changed with the same sign as the change of the power output.

7. The method in accordance with claim 6 wherein increasing the mass flow of the liquid agent further comprises controlling the mass flow of the liquid agent based on at least one of the setpoint and an actual setting of the inlet volume flow control appliance.

8. The method in accordance with claim 1 wherein increasing the mass flow of the liquid agent further comprises increasing the mass flow of the liquid agent based on at least one of a compressor discharge pressure, a compressor pressure ratio, and a gradient of the compressor discharge pressure and/or compressor pressure ratio.

9. The method in accordance with claim 1 further comprising:
determining at least one temperature inside the compressor, or downstream from the compressor and upstream from a combustor; and
increasing the mass flow of the liquid agent provided to the compressor gas mass flow dependent upon at least one of the determined temperatures, and a gradient of at least one of the determined temperatures.

10. The method in accordance with claim 1 wherein increasing the mass flow of the liquid agent further comprises increasing the mass flow of the liquid continuously until the second rate is reached.

11. The method in accordance with claim 1 wherein increasing the mass flow of the liquid agent further comprises increasing the mass flow of the liquid in discrete steps until the second rate is reached.

12. The method in accordance with claim 1 further comprising decreasing the mass flow of the liquid agent from the second rate to a lower rate after a predetermined period of time has elapsed after a stationary power output has been reached subsequent to the adjustment time period.

13. The method in accordance with claim 1 wherein increasing the mass flow of liquid agent added to the compressor gas mass flow from the first rate to the second rate is accomplished during a first portion of the adjustment time period, the first portion comprising about fifty percent of the adjustment time period.

14. A gas turbine engine comprising:
a compressor;
an inlet volume flow control appliance suitable to control a compressor gas mass flow to said compressor;
a liquid flow control appliance for controlling an inlet volume mass flow of liquid agent into to the compressor gas mass flow;
a control device in signal communication with said inlet volume flow control appliance and said liquid flow control appliance; and
a turbine engine coupled downstream from said compressor, said inlet volume flow control appliance, and said liquid flow control appliance, said inlet volume flow control appliance variably adjustable to operate the gas turbine engine with a compressor inlet volume flow below a maximum compressor inlet volume flow, wherein said control device is configured to:
operate the gas turbine engine with the inlet volume flow control appliance set to operate the gas turbine engine at a first level of a compressor inlet volume flow, wherein the first level is below a maximum compressor inlet volume flow;
add a mass flow ($\dot{m}_{Liq}$) of a liquid agent at a first rate to a compressor gas mass flow while the inlet volume flow control appliance is set to operate the gas turbine engine at the first level of the compressor inlet volume flow;
adjust the inlet volume flow control appliance to increase the compressor inlet volume flow from the first level to a second level, the adjustment occurring over an adjustment time period;
adjust the liquid flow control appliance to increase the mass flow of liquid agent added to the compressor gas mass flow from the first rate to a second rate during the adjustment time period; and
after the adjustment time period, maintain operation of the gas turbine engine at the second level of the compressor inlet volume flow and the second rate of the mass flow of liquid agent.

15. The gas turbine engine in accordance with claim 14 wherein said control device adjusting the liquid flow control appliance to increase the mass flow of liquid agent added to the compressor gas mass flow from the first rate to a second rate during the adjustment time period facilitates increasing a power output of said gas turbine engine without increasing a turbine inlet temperature.

16. The gas turbine engine in accordance with claim 14 wherein said inlet volume flow control appliance comprises at least a first row of inlet guide vanes having a variable pitch.

17. The gas turbine engine in accordance with claim 16 wherein said liquid flow control appliance is further configured to provide the liquid agent to the compressor gas mass flow upstream from a first row of rotating compressor blades.

18. The gas turbine engine in accordance with claim 16 wherein said liquid flow control appliance is further configured to provide the liquid agent to the compressor gas mass flow upstream from said first row of variable guide vanes.

19. The gas turbine engine in accordance with claim 14 wherein increasing the mass flow of liquid agent added to the compressor gas mass flow from the first rate to the second rate is accomplished during a first portion of the adjustment time period, the first portion comprising about fifty percent of the adjustment time period.

* * * * *